(31.)
C. W. SALADEE.
Improvement in Top Joints and their Connections.
No. 122,063.      Patented Dec. 19, 1871.
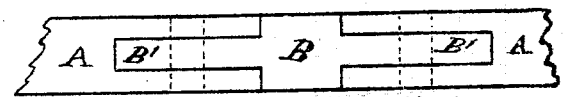
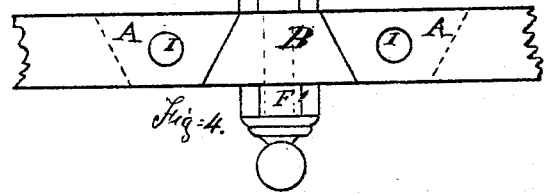
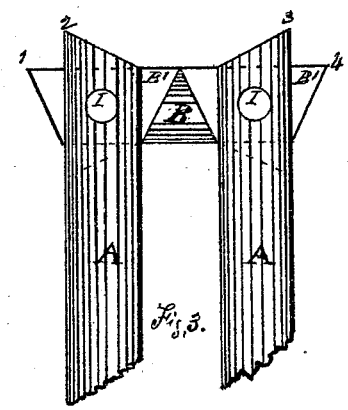
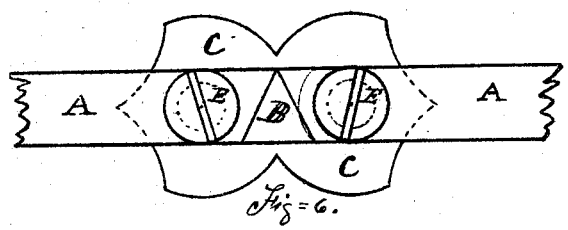
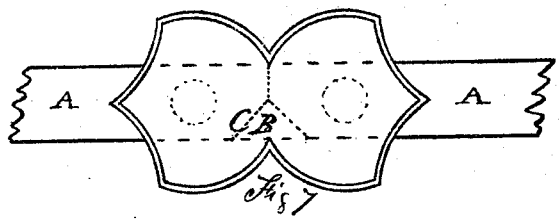
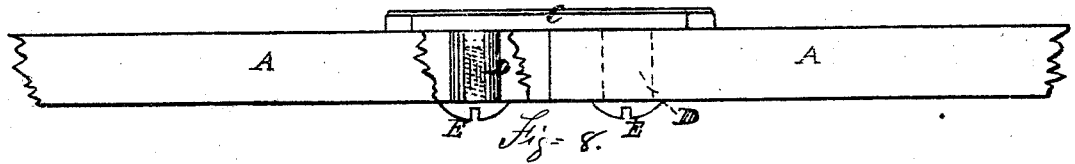
Witnesses
Chas. F. Raum
Edw. F. Brown
Inventor
Cyrus W. Saladee

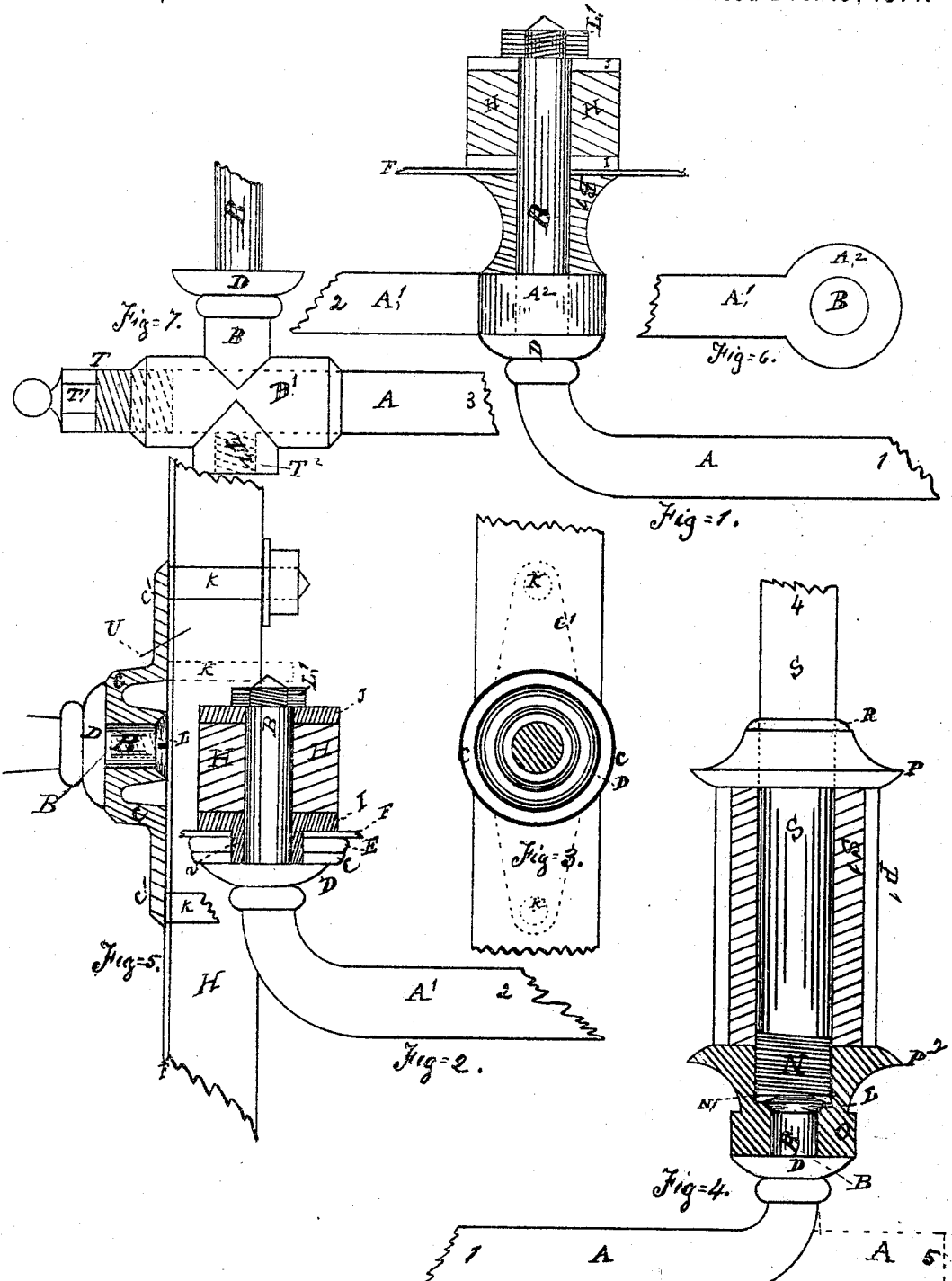

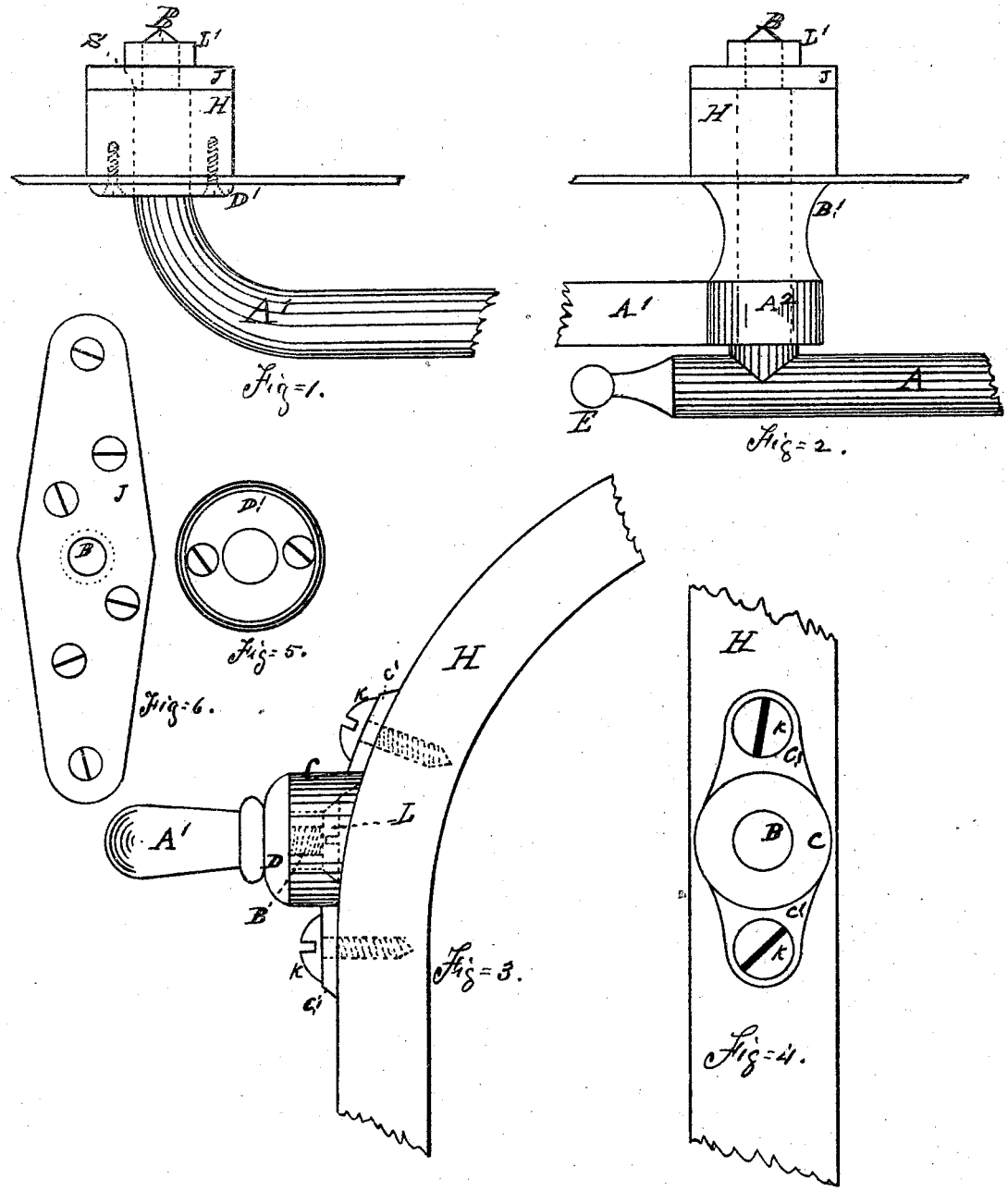

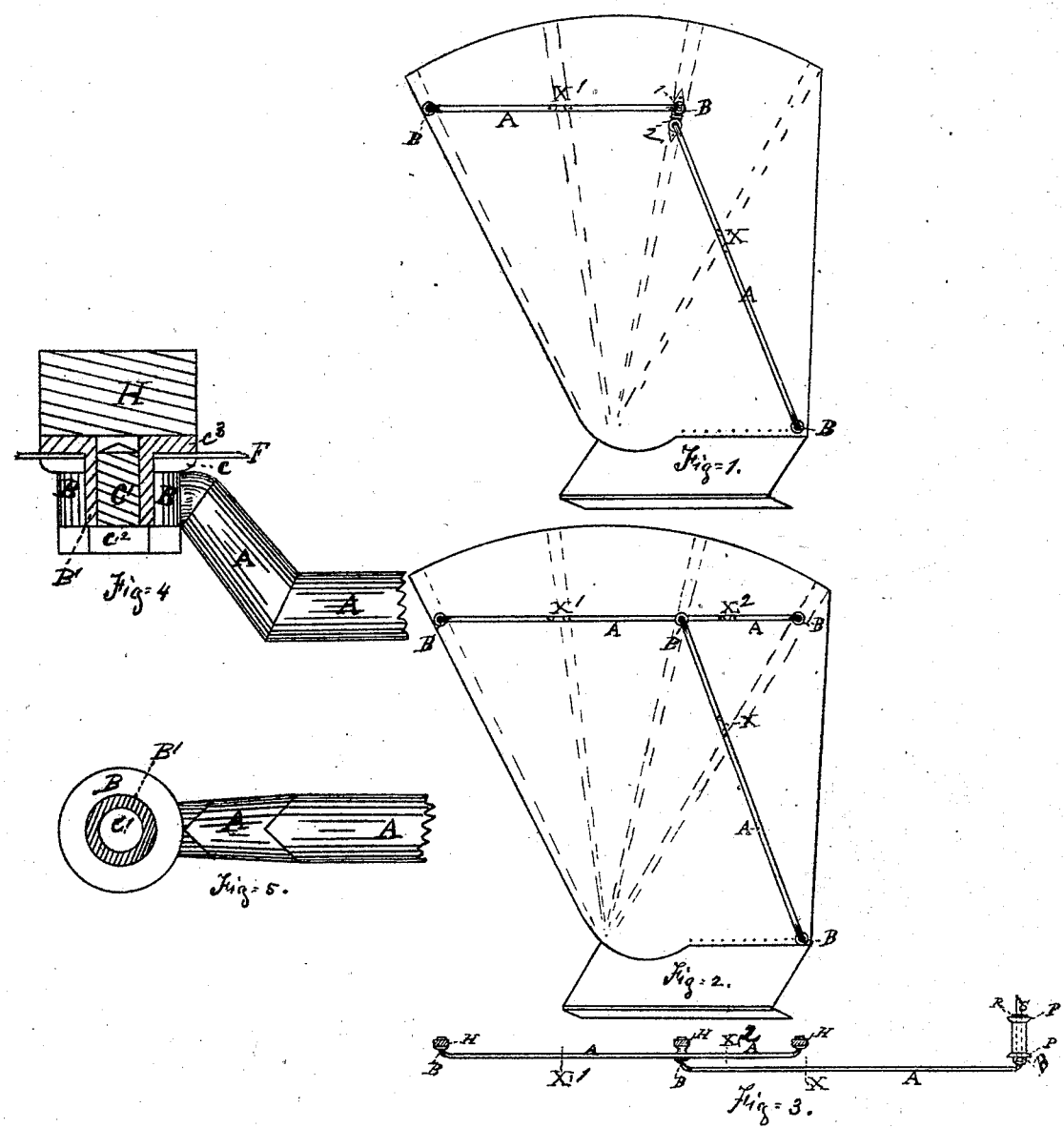

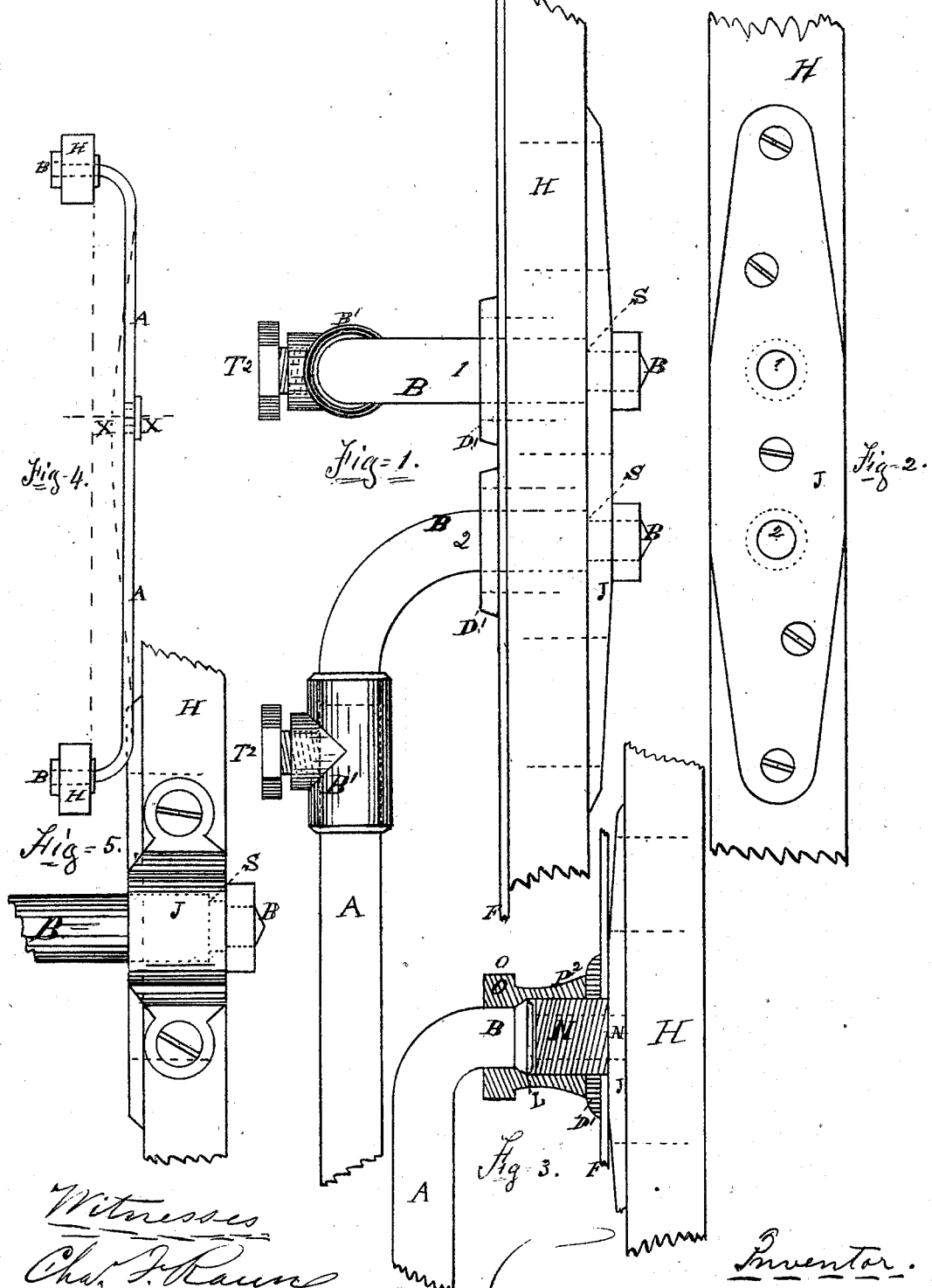

(31.)  
6 Sheets—Sheet 6.
C. W. SALADEE.
Improvement in Top Joints and their Connections.
No. 122,063.  
Patented Dec. 19, 1871.
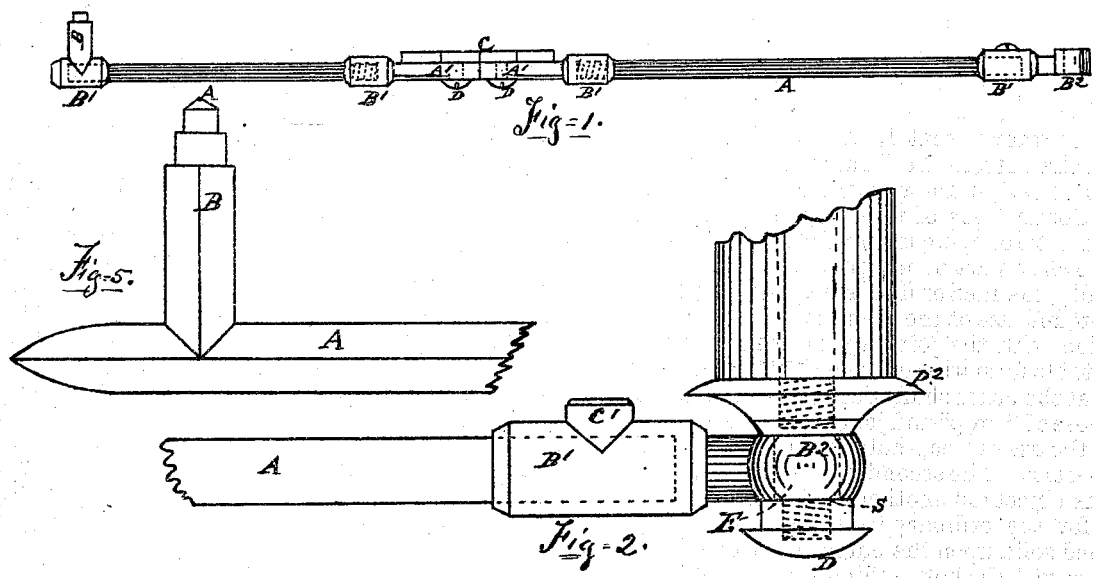
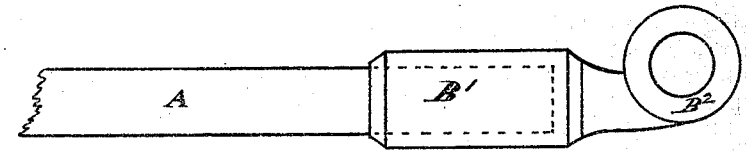
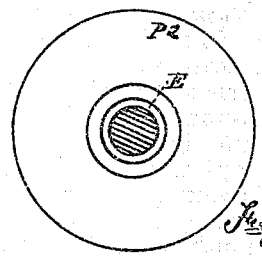

122,063

UNITED STATES PATENT OFFICE.

CYRUS W. SALADEE, OF ST. CATHARINES, CANADA.

IMPROVEMENT IN TOP-JOINTS AND THEIR CONNECTIONS.

Specification forming part of Letters Patent No. 122,063, dated December 19, 1871.

Be it known that I, CYRUS W. SALADEE, of St. Catharines, in the Dominion of Canada, have invented certain Improvements in Top-Joints and their Connections, of which the following is a specification embodying my invention:

The first part of my invention contemplates, broadly, the idea of discarding entirely the application and use of the ordinary "top-prop" in connection with the joint-irons of carriage-tops by a suitable formation of the ends of the joint-irons, so that the latter shall effectually serve the double purpose of "prop" and joint; and so, also, as to discard the use of "cap-nuts" in connection with the joint-irons. The second part of my invention has for its object (as another modification) substituting for the ordinary "top-prop" a bolt having formed solid upon the outer end thereof, at right angles with the bolt, a thimble or socket, closed at one end, for the reception of the ends of the joint-irons of the top, while the inner end of this bolt is secured to a stationary plate upon the bow of the top in such manner as to allow the bolt to rotate, as required, by raising and lowering the top. By this modification of my invention the joint-irons may be completed, japanned, and plated ready to apply to the top, requiring only to have the ends entering said thimble-bolt cut off to get the required position of the knuckle-joint and exact length of the irons, when they are passed into the thimble or socket and there secured by a set-screw or otherwise. The third part of my invention relates to the seat-prop in connection with the bow-rest, and their connection with the lower end of the long joint-iron to carriage-tops, as hereinafter more particularly shown and described. The fourth part of my invention relates to the improved method of securing and operating joint-irons upon carriage-tops, as hereinafter described and claimed. The fifth part of my invention relates to the "knuckle-joint" for carriage-tops, and consists in making the joint double, operating upon two pivots and having an intermediate brace between, as and for the purpose hereinafter fully shown and described.

In the drawing, Figure 1, Sheet 1, represents my improvement on the end of the joint-iron A of the long joint of the top, in position upon the third bow. In this figure A is the upper end of the long joint-iron, broken off at 1, the opposite end of which is bent at right angles with the main iron A and forming the bolt B, between which and the curve in the iron A is formed the shoulder D. The bolt end B of the joint-iron A, in this modification, passes through the bow H, an end view of which latter is seen in section. To compensate for the hole made through the bow at this point, plates I and J may be secured to the bow with holes through to admit of passing the bolt B. F represents an edge view of the leather of the top. $A^1$, in this figure, represents the back end of the short or front joint-iron, broken off at 2, and in position on the bolt B, next the collar D. Fig. 6, Sheet 1, is a detached view of the same. For the purpose of throwing the end of the joint-iron $A^1$ as far away from the side of the top at this point as it is on the front bow I introduce the loose thimble $B^1$, Fig. 1, Sheet 1, shown in section, between the joint-iron $A^1$ $A^2$ and the outside of the leather of the top. The bolt end B of the joint-iron A is held, in this modification, in its position through the bow by a screw-tap, L', as shown, and so arranged that the bolt end B of the iron A will rotate in its bearing in the bow as the top is thrown back or raised up.

Fig. 2, Sheet 1, is the front end of the upper or short joint-iron $A^1$, broken off at 2, and in position on the front bow of the top, with the bolt end B of the iron $A^1$ passing through the bow the same as shown in Fig. 1, with this exception, to wit, that the outer plate I of the bow H is provided with a raised collar, $v$, which receives the rubber or elastic collar E, leather of the top F, and loose metallic washer $c$, resting against the collar D. The object of the interposition of the rubber washer E in this modification, is to keep the parts tight and prevent rattling when the top is thrown back. Fig. 3, Sheet 1, is a face view of the front bow, showing the shoulder D and loose collar C, seen in Fig. 2.

Fig. 5, Sheet 1, represents an edge view of the bow H, having the bolt end B of the joint-iron secured to a stationary cap-plate, $c$ and $c'$, resting against the bow on the outside of the leather F, and there held by means of light bolts or screws. In this modification the turned or bolt end B of the joint-iron A is held to the cap-plate $c\ c'$ (which latter is shown in section) by means of a screw, L, as plainly seen in the drawing, and by which the bolt end B is held in position so as to allow it to rotate in the cap-plate when raising or lowering the top. (Also see Fig. 3, Sheet 5.)

Still another modification for securing the bolt end B of the joint-irons to or upon the bow is shown on Sheet 2 of the drawing. Fig. 1 shows the end of the joint-iron A¹ bent, and passing through the bow without the collar D, seen in Fig. 3, Sheet 2. A hole is made through the bow to receive the bolt end of the joint-iron, as shown in Fig. 1, Sheet 2, and over the outside of which is placed the washer D' with screws, as may be seen by Fig. 5; and to compensate for weakening the bow by the passage of this hole, a plate, J, (a face view of which is seen by Fig. 6,) is screwed on the inside of the bow, (also see Figs. 1 and 2, Sheet 5,) which has a hole through for the passage of the extreme end of the joint-iron A¹, which has the shoulder S formed upon it to rest against the inside of the plate J, and on the outside of this plate is the screw-tap L'; and thus the shoulder S prevents the bolt end B of the joint-iron from passing any further through the bow than up against the inside of the plate J, while the screw-tap L' prevents it from working back, and by this means the shoulder D, seen in Fig. 3, Sheets 1 and 2, is dispensed with.

Fig. 2, Sheet 2, is substantially the same arrangement shown by Fig. 1, Sheet 1, with the exception that in place of bending the end of the joint-iron, as seen in the latter figure, to form the bolt B, the joint-iron is left straight, with the bolt B welded thereon, as plainly shown in this Fig. 2, Sheet 2, and the end of the joint-iron is finished, as seen at E.

Fig. 3, Sheet 2, is an edge view of the front bow, showing the same modification represented by Fig. 5, Sheet 1, with the exception that the cap-plate c c' is curved on the under side, next the bow H, so as to fit the bend of the bow at this point and yet have the bearing on the outside of the cap C on a perpendicular line for the collar D of the joint-iron to work against when raising and lowering the top. Fig. 4, Sheet 2, is a face view of Fig. 3.

Fig. 7, Sheet 1, is a top view of still another modification. A is the end of the joint-iron. B¹ is an open socket, wrought or cast solid upon the bolt B, which latter is secured to the bow of the top the same as shown and described in either of the other modifications. The outer end of the socket has a set-screw, T T¹, against which the end of the joint-iron A rests when in position in the socket, and is there held by a set-screw, T²; but in the use of this socket B¹, I prefer to form it with the outer end closed without the use of the set-screw T and allow the joint-iron A to rest against it. The only object of this set-screw T is, that in case the joints should become loose they might be tightened by turning the set-screw into the socket and so press against the end of the joint-iron, and, accordingly, lengthen the space between the bows to which the joints are secured. But I lay no claim to the idea of an adjustable top-joint after it is applied to the top, as that is an old device and of no practical purpose; but the idea of a closed thimble or socket, B¹, formed upon the bolt B to receive the outer ends of the joint-irons, as seen in Fig. 7, Sheet 1, or in the other modification seen in Fig. 1, Sheet 5, to facilitate the application of the joint-irons to carriage-tops, I claim as new and of my invention.

By the use of such socket the manufacturer of the joint-irons is enabled to furnish the complete set of top-irons to the trade in a state so nearly complete and ready for application by the carriage-maker as to require only cutting off the irons to the required lengths; requiring no welding or other preparation.

In the modification Fig. 1, Sheet 5, the socket B¹ is formed on the end of the bolt B, which is bent and connected to the end of the main joint-iron A, as plainly seen in the drawing. In this case the bolt end B with the socket B¹ can be more cheaply and uniformly produced of malleable cast-iron than of wrought, and answers the same purpose. The ends of the joint-irons A, after having been cut off the proper lengths, may have a short screw-thread cut on them and by that means be screwed into the open end of the socket B¹ and dispense with the set-screw T², seen in the figures last above referred to; but I consider the set-screw equally as secure, and, besides, it serves to make an ornamental finish.

Fig. 4, Sheet 1, represents the seat-prop S with the bow-rest P¹ and lower end of the long joint A in position. The seat-prop S has formed solid therewith the collar R, against which to stop and rest the loose cap P. S¹, in section, is a tubular piece of wood, around which is the rubber tube P³, shown in section, which, with the wood tube, is passed over the seat-prop S. The outer end of the seat-prop S has cut upon it the screw-thread N. P² and O, in section, is the outer cap of the bow-rest P¹. That part of this cap seen at O is made octagon in form on its outer diameter, so as to take hold of it with a wrench, and screw the cap P² upon the thread N and firmly up against the end of the bow-rest. The outer end of this cap P², through its portion O, has a hole to receive the bolt end B of the joint-iron A resting against the collar D, and is there held by riveting a head, L, on the end of the bolt B, and so as to allow the latter to rotate in the end O of the cap P² when raising or lowering the top. If preferred, the inner end of the bolt B may be held in position in the cap O, P², by the use of a screw, the same as shown and described in the modification Fig. 5, Sheet 1, and answer equally well.

I will here state that, as another modification for securing the bolt end B of the joint-iron A to the bows of the top, I may secure a short stud upon a plate, C C', (see Fig. 4, Sheet 2,) at B, having a screw-thread cut thereon, as seen at N, Fig. 4, Sheet 1, and by Fig. 3, Sheet 5; and by the use of exactly the same arrangement of cap P² O may secure the bolt ends of the joint-irons A to the bows the same as shown upon the seat-prop S, in Fig. 4, Sheet 1, or Fig. 3, Sheet 5. In this case, however, a loose washer, C, as shown in Fig. 2, Sheet 1, or D', Figs. 1 and 3, Sheet 5, would have to be interposed between the inside surface of the cap P² and the leather of the top to prevent the cap from wearing the leather while being screwed up against it.

I, therefore, wish it to be expressly understood that I do not limit my claims to any particular practical method of making the connection between the bolt end B of the joint-iron A and the side of the top. For, as already shown, there are a great variety of methods that may be adopted for this purpose, and all alike producing the same result; and, hence, I claim any device that will accomplish this purpose in the absence of the ordinary "top-prop" and "cap-nut," or for the purpose of securing a joint between the outer ends of the joint-irons A and the bows of the top, when said ends of the joint-irons are not provided with the ordinary prop and eye, as the eye at B, Fig. 6, Sheet 1, and the eye of the iron is bent outward immediately back of the eye, so as to allow the latter to rest against the leather of the top, with or without a loose collar intervening, and a bolt passing through the eye, and so that the main body of the joint-iron A or $A^1$ is on a parallel line with the side of the top and outside of the outer face $A^2$ of the eye B, Fig. 6, Sheet 1, as this is but another modification of my invention, and which also I broadly claim as a part of the same, substantially as last above shown and described. Figs. 4 and 5, Sheet 3, more clearly represent this modification of my invention.

Figs. 1 and 2, Sheet 3, of the drawing represent two side elevations of the top, having my improved top irons in position. The rear end of the joint $X^1$, Fig. 2, and the upper end of the long joint X are now universally secured and operated to a single "prop" upon the third bow from the front; but the application of the irons is simplified by securing these ends upon that bow on two separate and independent prop-bearings 1 and 2, Fig. 1, and Figs. 1 and 2, Sheet 5, as shown, and so that each joint-iron is operated separate from and independent of the other. And another valuable feature in this mode of applying the irons is that it gives a much neater appearance to the irons than when the two are secured to one prop, as is now the custom.

Figs. 2 and 3, Sheet 3, represent another modification for the application of my improvement. In this modification the upper joint $X^1$ extends back of the third bow, and takes the back bow as well. The joint $X^1$ will "knuckle" upward, while the joint $X^2$ will "knuckle" downward when lowering the top. The object of thus extending the joint-iron back of the third bow, as described, is to keep the leather between the latter joints constantly stretched and in shape.

Fig. 3, Sheet 3, is a top view of the arrangement of the joint-irons last described, and which clearly represents the mode of doing it. Fig. 4, Sheet 5, is another top view of the joint-iron in position. The dotted line X is the bend the iron may take if needed to throw the joint X in toward the top at that point.

The last part of my invention relates to a new and improved mode of constructing the "knuckle-joint" for top irons, or for any other purpose where this kind of a joint is required. In the drawing, Sheet 4, Fig. 1, is a side view of my improved joint. Fig. 2 is a top view of the same, and Fig. 3 is a side view as it appears when "broke" or "knuckled." Fig. 4 is a side view, and Fig. 5 is a top view of another modification of the other three figures named. Fig. 6 is an inside view, Fig. 7 an outside view, and Fig. 8 a top view of still another modification of my invention in knuckle-joints.

The main feature in this part of my invention is in the use of two pivots and the double joint. The ends of the iron A, in Figs. 1, 2, 3, 4, and 5, are cut off in an angular or bevel line and milled out in the center to form a slot for the reception of the corresponding ends of the intermediate brace B, as seen in the top views of Figs. 2 and 5, and by Fig. 3. The intermediate brace B (see Fig. 3) is milled or otherwise formed upon the tenon $B^1$. The joints are now put together—as clearly shown by Figs. 1, 2, and 3—by means of the pivots I and I, and when the joint is straightened the ends of the parts A and A rest against the brace B, forming a "stop." A joint thus made will admit of its being formed perfectly round throughout its length, and when so finished the location of the joint upon the iron A cannot be discerned except upon close inspection, and so render the joint-iron for carriage-tops perfectly smooth and clean throughout their entire length. But in case the joint is preferred with some distinctive ornamentation upon the iron when it is located, the main iron A may be made round and the brace B left square, as seen by Figs. 4 and 5, and plated, and the joint may be still further ornamented by passing through the brace B a light-plated fancy-headed bolt, F, with a tap, F', on the opposite side of exactly the same design as the head F, and thus impart a very ornamental appearance to the joint. But I consider the modification shown by Figs. 6, 7, and 8 the most desirable, because more easily and cheaply constructed, and at the same time stronger and more sightly in appearance. In this modification the plate C is formed of any design the fancy may suggest, and on the inside of this plate is formed, or cast as part of the same, the intermediate brace B and the studs or pivots D. (See Fig. 8.) The length of these pivots D is equal to the thickness of the irons A, and through which pass screws, E, the heads of which hold the irons A in position on the pivots D and plate C. The outside of the joint-plate C, Fig. 7, is "capped" or plated. The operation of this modification of joint is the same as described in the other figures, and the necessary detail for their ready, cheap, and rapid manufacture is a matter easily determined from the nature of the work to be done. Another point of advantage in this last-described modification over the others is, that in operating the joint the protruding ends 1, 2, 3, 4, Fig. 3, are hid from an outside view by the arrangement of the joint-plate C; and there are but two of these protruding ends in this modification, while in Fig. 3 there are four. The size and dimensions of the various parts can only be determined by the size and strength of the joint required.

I will here state that as another modification for securing and operating the ends of the joint-irons, as shown by Figs. 1 and 2, Sheet 1, Figs. 1 and 2, Sheet 2, and Fig. 1, Sheet 5, in place of passing the bolt end B directly through the bow, and held by the plate J on the inside of the bow, a suitable plate, with an eye in depth equal to the thickness of the bow, may be secured to the edge of the bow and allow the bolt end B to pass through and be held therein, and thus discard the use of the plate J and the hole through the bow entirely, as in this modification the bolt B is passed through said eye immediately in front or back of the bow, and answers the same purpose equally well. (See Fig. 5, Sheet 5, which clearly shows this last-described modification.)

Still another modification of my invention is shown on Sheet 6 of the drawing, where C, D D, $A^1$ $A^1$, and $B^1$ $B^1$, Fig. 1, represent my double-knuckled joint, hereinbefore shown and described, made malleable, cast with the sockets $B^1$ solid on the ends of the short arms $A^1$. Into these sockets $B^1$ are secured in any permanent manner the intermediate wrought-iron or steel arms A, the outer ends of which latter enter like cast sockets $B^1$, as is clearly shown by Figs. 1, 2, and 3 on this sheet. This modification enables me to put my complete top irons in the market in such a finished state that they can be applied by the carriage-maker without further preparation than to cut off the wrought or steel arms the requisite lengths and then rigidly secure them into the sockets $B^1$, substantially as shown by Fig. 1. Also, this modification of a cast joint and ends $B^1$, in combination with the plain arms A of wrought iron or steel, enables me to produce the best possible quality of cheaply-constructed top joints and connections. Fig. 2, Sheet 6, is a representation of the outer cap $P^2$ of the seat-prop, which has a short bolt, E, seen in dotted lines, formed solid on its outer end, on which is received the eye $B^2$ of the socket $B^1$, which latter receives the lower end of the joint-iron A, and the whole is held upon the bolt E by the capped screw-tap D, as shown. Fig. 5, Sheet 6, represents the end of the joint-iron A, having the bolt or "prop" B welded solid thereon, as shown, and which is but another modification of my invention relating to rigidly connecting the bolt or "prop" B with the joint-irons, as hereinbefore recited and shown.

I claim as my invention—

1. Forming the end or ends of the joint-irons to carriage-tops in such manner that they shall serve the purpose and take the place of the "top-props" as now generally known and used.

2. Forming the end or ends of the joint-irons to carriage-tops to serve the purpose of the ordinary top-props, and passing the same through or past the bow of the top in such manner that they will admit the end of the iron to rotate in that position when raising and lowering the top.

3. Turning the end or ends of the joint-irons to carriage-tops in toward the top at right angles with the main joint-iron, and securing the turned end to a fixed plate upon the bow of the top in such form as to make a joint at this connection and allow the end of the joint-iron to rotate in or upon said plate when raising or lowering the top.

4. The combination of the lower end of the long joint-iron to carriage-tops with the end cap $P^2$ of the seat-prop S, Fig. 4, Sheet 1, in any equivalent manner, substantially as and for the purpose set forth.

5. A seat-prop S, Fig. 4, Sheet 1, provided with the shoulder R against which to stop and rest the inner cap P of the bow-rest $P^1$, as and for the purpose set forth.

6. The thimble $B^1$, Fig. 1, Sheet 1, for the reception of the bolt end B of the joint-iron A, and securing the end of the bolt B in or upon a fixed plate upon the bow of the top, or passing it through the bow, as shown by this figure, and for the purpose described.

7. Forming a socket, $B^1$, Fig. 7, Sheet 1, to receive the end of the joint-iron A, solid, with the bolt B, and securing the inner end of the latter to a fixed plate upon the bow, or passing it through the bow in any practical manner that will admit of the bolt revolving in its bearing when raising or lowering the top.

8. Extending the upper joint-iron $X^1$, Figs. 2 and 3, Sheet 3, so as to form a joint, $X^2$, between the third and back bow of the top, substantially as shown and described.

9. Securing and operating the joint-irons A and A, Fig. 1, Sheet 3, and Figs. 1 and 2, Sheet 5, upon the bow of the top on two separate bearings or "props," 1 and 2, and independent of each other.

10. A double knuckle-joint, (see Sheet 4,) constructed and operating substantially as shown and described.

11. In double knuckle-joints, the intermediate brace B. (See Sheet 4.)

12. In double knuckle-joints, the face-plate C, Figs. 6, 7, and 8, Sheet 4, having the intermediate brace B and the pivots D formed thereupon, as and for the purpose set forth.

13. A double knuckle-joint, Figs. 1, 2, and 3, Sheet 4, made round or oval in the body of the joint, so as to present a perfectly smooth and uniform surface throughout, as and for the purpose set forth.

14. In combination with the device claimed in the first seven claims, or either of them, the use of elastic or rubber washers to keep the parts closely fitted when that is requisite, and to prevent rattling.

15. The socket $B^1$, Fig. 1, Sheet 5, in combination with the bent bolt or prop B and the end of the joint-iron A, as and for the purpose shown and described.

16. A top-joint, C, Fig. 1, Sheet 6, provided with short arms $A^1$, sockets $B^1$, in combination with the intermediate wrought-iron or steel arms A, substantially as and for the purpose set forth.

17. Rigidly connecting the outer ends of joint-irons for carriage-tops by welding or otherwise to the bolt or "prop" B, Figs. 1 and 5, Sheet 6, and so that the inner end of the bolt or prop B shall partially revolve in its bearing in or upon the bow of the top when raising or lowering the same.

CYRUS W. SALADEE.

Witnesses:
EDM. F. BROWN,
I. W. DEENER.